INVENTOR.
Clifford E. Sloop

Aug. 3, 1965 C. E. SLOOP 3,198,876
RINGLESS SOCKET METER BOX
Filed April 26, 1963 3 Sheets-Sheet 2

INVENTOR.
Clifford E. Sloop
BY
Newton, Hopkins & Jones
ATTORNEYS

Aug. 3, 1965  C. E. SLOOP  3,198,876
RINGLESS SOCKET METER BOX
Filed April 26, 1963  3 Sheets-Sheet 3
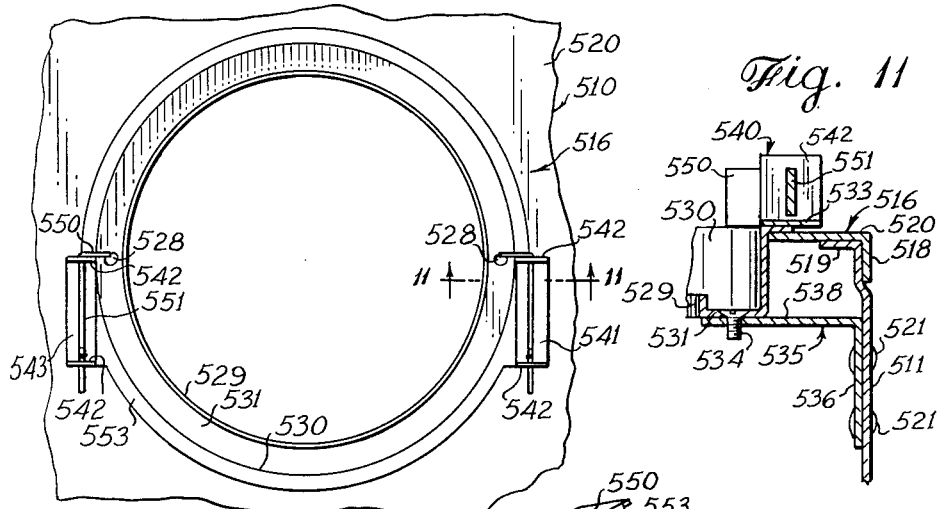
Fig. 10
Fig. 11
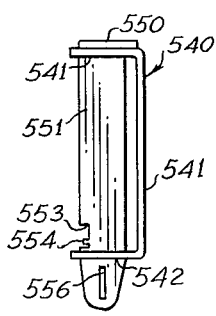
Fig. 12
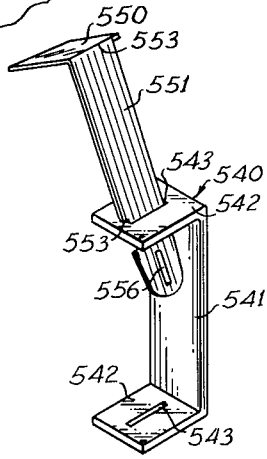
Fig. 13
INVENTOR.
Clifford E. Sloop
BY
Newton, Hopkins & Jones
ATTORNEYS

United States Patent Office 3,198,876
Patented Aug. 3, 1965

3,198,876
RINGLESS SOCKET METER BOX
Clifford E. Sloop, 2230 10th St., Columbus, Ga.
Filed Apr. 26, 1963, Ser. No. 276,041
10 Claims. (Cl. 174—52)

This invention relates to an electrical meter box and is more particularly concerned with a meter box having a cuff on the front plate thereof, the cuff protecting the meter box from the entry of water.

During the years from 1932 to 1935, the electric utilities began using socket type, self-contained meters and meter boxes or sockets, as they are sometimes termed, for installation in an electrical service line so that the meter measures the electricity delivered to the customers. In these early meter boxes, the sockets were all of the ring type, wherein the assembly included a hooded ring simultaneously extending around the flange of the socket and the abutting base of the meter. In order for the ring to be placed on the flange and the base, the meter had to be correctly placed with respect to the meter box. The ring, after being installed, was clamped in place by means of a set screw.

More recently, the ringless socket or meter box has practically replaced the ring type socket because of the operating advantages and the economy which it provides. The ringless meter box is generally used in capacities from 100 to 200 amperes, at 240 volts. Both single-phase and three-phase service may be provided through the ringless meter box.

The ringless meter box includes a removable front cover or plate which is placed thereon after the meter has been installed in the socket. This metal cover, because of its structural shape, need not be more than about one-sixteenth inch thick for the strength required. An opening in the cover receives and circumscribes the glass portion of the meter while a portion of the cover overlaps the circular base of the meter. The tapered cylindrical glass portion extends forwardly from the meter box and is of a larger diameter at its base than at its forwardmost portion.

While, theoretically, the cover fits uniformly against the front surface of the base of the meter so as to prevent the entrance of water into the meter box, this arrangement is seldom achieved since, the meter may be tilted slightly in one direction or the other so as to tilt its base, or the meter is disposed too high or too low with respect to the cover. Furthermore, if the cover is bent only slightly, a sealed fit is not obtained.

Manufacturers are aware of the fact that the cover can seldom be placed properly against the front portion of the meter base and have taken steps to catch or deflect the water from the vital portions within the meter box or socket; however, the water does cause rust on the steel terminals and on the bottom of the meter box. Thus, some utilities have refused to use the ringless type socket or meter box, because of the inability to preclude water therefrom, even though such meter boxes were more economical and practical to utilize.

Another disadvantage of the ringless type meter socket or meter box is that, when a meter is installed therein, the spades of the meter may be improperly received in the jaws of the terminals without an indication from outward appearances that such a condition exists. This leads to an overheating of the meter box, the overheating occurring many months or even years after the installation of the meter. Thus, until a meter burns out and damages or destroys the relatively expensive meter and the terminals of the meter box, there is little indication of the faulty installation.

The larger sockets or meter boxes which are installed in 150–200 ampere circuits must receive conduits having two to three inches inside measurements. For this, the socket or meter box must have a depth of five to six inches. A nine inch three-phase demand meter on the socket is usually combined therewith and extends some 15 inches from the wall. The further such an installation protrudes from the wall, the greater is the chance of breakage. Also, such meter boxes or sockets which have a five to six inch depth must also be provided with an insulated mounting block for receiving and spacing the jaws forwardly from the back of the box. The mounting block must extend some three and one-half to four and one-half inches forwardly. In such installations, the relatively heavy cables must be bent forwardly and placed in a strained condition in order to be connected to their respective terminals. Very often, because of the bend which must be placed in the cables, they are improperly installed and heat, resulting from the poor connection, may, at times, burn out the connection.

The ringless sockets or meter boxes also have the disadvantage of having a cover or front plate which may be readily pried off of the receptable, without a breaking of the seal. When this has been accompilshed, the meter may be inverted and reinstalled so that it will not run properly, to indicate the proper delivery of electricity. The cover may be pried off of the meter box, because the circular opening in the cover must be out of round to permit it to slide into and out of a closed position, while the cover, at its top, is retained by only a short flange which, when the cover is displaced downwardly only to a slight extent, will permit the cover to be dislodged therefrom.

Briefly, the present invention, which overcomes the disadvantages described above, includes a meter box having a front plate or cover which may be installed on the receptacle prior to the installation of the meter and therefore may be either positively received in place or be of a configuration which cannot be readily removed from the receptacle. The cover of the meter box includes the usual circular opening, through which a portion of the meter protrudes so as to be engaged by the terminals within the box. A cuff or sleeve is carried by the cover and protrudes forwardly over a substantial portion of the meter so as to provide protection from the ingress of water into the meter box. In most embodiments of the invention, the rear portion of the meter base seats against a flange carried by the inner portion of the cuff or cover and a locking mechanism urges the front portion of the base of the meter inwardly so as to assure a firm seating of the base against the flange. The present invention, however, is not limited to the seating of the inner surface of the base, against such a bracket since, in certain embodiments thereof, the cover seats in a conventional manner while the cuff protrudes forwardly so as to protect this seated engagement against moisture.

Accordingly, it is an object of the present invention to provide a meter box for receiving a meter, the box including a pre-installed cover, through which the meter may be mounted and locked in place after installation of the meter.

Another object of the present invention is to provide a meter box which will more adequately protect the interior of the box from moisture.

Another object of the present invention is to provide a meter box which will assure the proper seating of the meter in the box.

Another object of the present invention is to provide a meter box which is inexpensive to manufacture, durable in structure, and efficient in operation.

Another object of the present invention is to provide a meter box which will afford a long useful life.

Other objects, features and advantages of the present invention will become apparent from the following description when taken in conjunction with the accompanying drawings wherein like characters of reference designate corresponding parts throughout the several views and wherein:

FIG. 10 is a fragmentary front-elevational view of a meter box containing a still further modified form of the present invention, the screw being removed to show the hole in the cuff flange.

FIG. 11 is a cross-sectional view taken substantially along line 11—11 in FIG. 10.

FIG. 12 is an enlarged side view of the latch of the device shown in FIG. 10, showing the latch in a locked position.

FIG. 13 is a perspective view of the latch shown in FIG. 12 and showing the latch in an unlocked position.

Figure 1:
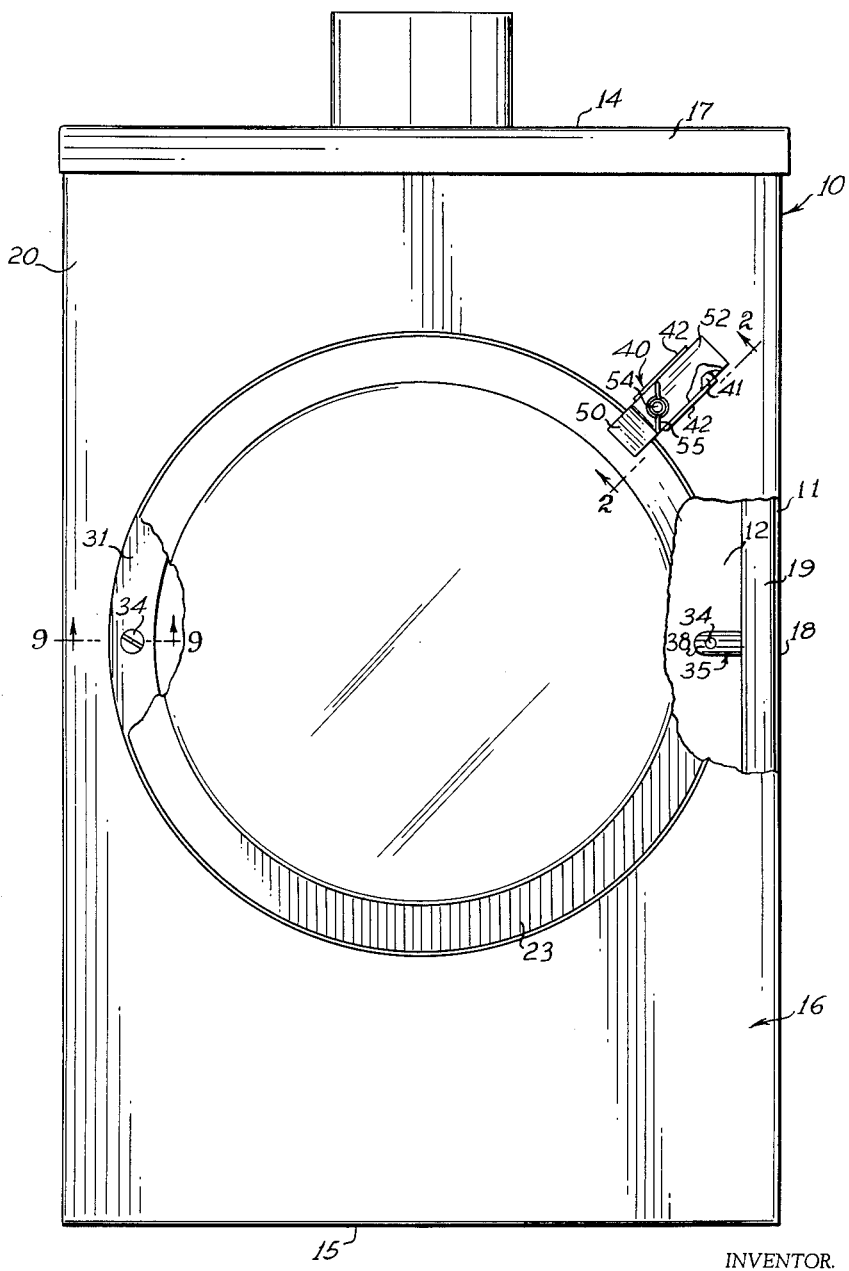
FIG. 1 is a partially broken away front elevational view of a meter box and meter, the meter box being constructed in accordance with the present invention.

Referring now in detail to the embodiment chosen for the purpose of illustrating the present invention, it being understood that in its broader aspects the present invention is not limited to the exact details herein depicted, numeral 10 denotes generally a meter box or socket of conventional configuration having a receptacle provided with a pair of opposed sides 11, a back 12, a top 14, and a bottom 15.

By way of illustration only, the front cover 16 of the meter box 10 is shown as being removable or of the ringless type, the upper edge of which is retained in place by a downwardly protruding flange 17 extending from the front edge of the top 14. The cover 16 includes a flat rectangular front plate 20, and a pair of side flanges 18 which overlap the forward edge portion of the sides 11 in the usual way. The bottom edge portion of cover 16 may be retained in place by a conventional lock (not shown) as will be understood by those skilled in the art. The plate 20 is provided with a circular central opening of a diameter larger than the diameter of the disk-shaped base 21 of a conventional meter 22.

The sides 11 include opposed inwardly extending front flanges 19, which form an abutment against which the front plate 20 abuts when the cover 16 is properly installed on the receptacle.

The meter 22 includes a forwardly protruding transparent glass cover 23 which encloses a conventional meter mechanism (not shown). In more detail, the cover 23 is generally cylindrical; i.e., a tapered frustoconical member which is of larger diameter adjacent the base 21 than it is at its outer extremity. The cover 23 is secured to the base 21 so as to seal, therewithin, the meter mechanism. The meter 22 also includes a plurality of rearwardly extending spades (not shown) which engage, and are received in, jaws of the terminals (not shown) of the socket so as to be electrically connected to the incoming cables (not shown) in the usual way. It will be understood that the meter base 21 includes a flat annular outer surface 24 and a relatively flat circular inner surface 25.

According to the present invention, the front plate 20 is provided with a cuff, collar, or sleeve 30, which is a hollow right cylindrical member having an inside diameter of substantially the same dimensions as the outside diameter of the base 21. In most instances, it may be found desirable to make the diameter of cuff 30 slightly larger than the diameter of base 21 whereby the cuff readily receives the base 21 snugly therein. The inner edge of cuff 30 is provided with an inwardly extending annular flange 31 which serves as an abutment to limit the rearward movement of the base 21 with respect to the cuff 30.

In the embodiments shown in FIGS. 1, 2, 4, 6, and 9, the depth of the cuff 30, from its outer edge 32 to the inner surface of flange 31, is substantially the same or slightly greater than the thickness or depth of the base 21, so that when the meter 22 is received on the cover 16, the base 21 is received entirely within the confines of the cuff 30.

In the embodiments of FIGS. 1, 2, 4, 6, and 9, the outer edge 32 of cuff 30 abuts the arcuate edge portion of the front plate 20 which defines the circular opening thereof. The two edges, i.e., edge 32 and the arcuate edge of front plate 20 which defines the circular opening, are secured together by means of weld 33 or the like.

Thus it is seen that the cuff 30 is concentric with the opening of front plate 20, and the axis of cuff 30 is perpendicular to the plane of front plate 20; the flange 31 being spaced inwardly of the front plate 20 by a distance about equal to the thickness of base 21. Hence, when base 21 is received within cuff 30, the front edge 32 is about parallel to the front surface of front plate 20.

Figure 9:
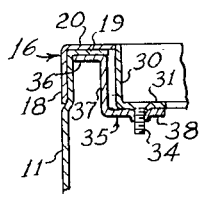
FIG. 9 is a cross-sectional view taken substantially along line 9—9 in FIG. 1.

For the purpose of securing the cover 16 in place on the meter box portion, the flange 31, on opposite side portions, is provided with holes through which project screws 34, the screws 34 respectively being threadedly received by the screw receiving portions 38 of fingers 35. As seen in FIG. 9, each finger 35 is secured to a side flange 19 by means of a base flange 36, the finger 35 being bent inwardly to provide intermediate portion 37 and then bent outwardly so as to provide the screw receiving portion 38. The screw receiving portion 38 of finger 35 is therefore disposed inwardly of base flange 36 and protrudes inwardly in an opposite direction from flange 36.

The intermediate portion 37 of finger 35 is of such a length as to dispose of the screw receiving portion 38 slightly inwardly of the flange 31 so that as screw 34 is tightened, the cover 16 is drawn snugly against the front edge of the box portion of the meter box. It will be understood that when the meter 22 is installed on the meter box, the base 21 covers screws 34 and, hence, so long as the meter 22 is installed thereon, the cover 16 may not be removed from its supporting receptacle.

Figure 2:
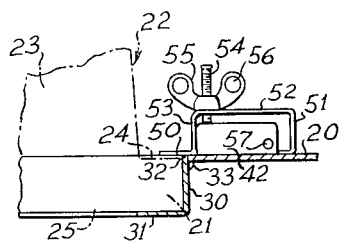
FIG. 2 is a cross-sectional view taken substantially along line 2—2 in FIG. 1.

In the embodiments of FIGS. 1 and 2, the meter 22 is removably secured in place by means of one or a plurality of locking devices 40 radially spaced around the central opening of front plate 20. Each locking device including a retaining lug and a keeper member, the keeper member having a web 41, from the edges of which extend, in an outwardly direction, a pair of opposed parallel side plates 42. The keeper member therefore forms a channel member which is disposed radially adjacent the central opening of front plate 20 and is spot-welded, or otherwise secured to the outer surface of front plate 20. The channel member slidably receives therein, a locking tongue 50 of the retainer lug, the tongue 50 being a flat rectangular member substantially longer than the channel member so that its inner portion protrudes over the outer surface 24 of the base 21 of meter 22. The outer end of tongue 50 is bent forwardly to provide an outstanding back edge 51 which is, in turn, bent inwardly to provide a top bar 52, the top bar 52 being essentially parallel to the tongue 50 and its inner edge being bent inwardly so as to provide a front edge 53 which abuts the tongue 50 at an intermediate portion thereof. Thus, a closed loop is provided in the tongue 50, outwardly of its inner edge.

Protruding outwardly from the web 41 of the channel member, is a stud 54 which, when the retainer lug is received in the channel member, protrudes through aligned holes respectively in tongue 50 and bar 52 so as to position the tongue 50 in its locking position as seen in FIGS. 1 and 2. A wing nut 55 is threadably received on the stud 54 outwardly of the retainer lug, and when tightened against the bar 52, securely holds the tongue 50 in place, the side plates 42 preventing appreciable rotary movement of the retainer lug about stud 54.

The flat portions of wing nut 55 are provided with holes 56 through which the cable portion of a conventional seal (not shown) may pass, the plates 42 being provided with holes 57 which also are adapted to receive the cable of the seal. Thus, when the cable of the seal is looped through these holes 56 and 57 the wing nut 55 may not be appreciably rotated.

Figure 4:
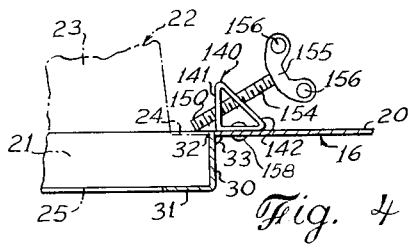
FIG. 4 is a view similar to FIG. 3 and showing another modified form of locking mechanism suitable for clamping the base of the meter socket against the cover of the meter box.
Figure 6:
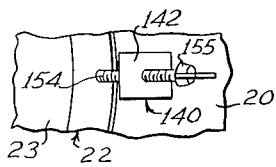
FIG. 6 is a fragmentary front elevational view of that portion of the meter box and meter shown in FIG. 4.

In FIGS. 4 and 6, it will be seen that a modified locking mechanism 140, which may be substituted for the locking device 40, is provided which is suitable for applying a substantial clamping pressure on base 21 to urge the inner surface 25 of base 21 against the flange 31. This locking mechanism 140 includes a keeper member in the form of a triangular bolt retaining block which threadably receives a bolt or lug 154 having a wing cap 155 provided with holes 156. The bolt 154 is disposed at approximately 45 degrees with respect to the surface of front plate 20 so that when it is tightened, the inner end 150 of bolt 154 engages the outer surface 24 of base 21.

Figure 5:
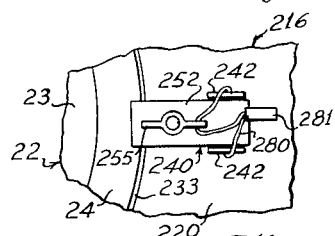
FIG. 5 is a fragmentary front elevational view of that portion of the meter box and meter shown in FIG. 3.

Preferably, the retaining block of FIGS. 4 and 5 is a tubular member, one side of which is bradded, by means of a brad 158, to the surface of front plate 20, adjacent the edge 32 of cuff 30. The tubular member has an outstanding inner side 141 and a hypotenuse side 142, the sides 141 and 142 being provided with aligned apertures which threadedly receive the bolt 154. When it is desired to remove the meter 22, the bolt 154 is rotated so as to retract its inner end 150 to the plane of side 141.

Figure 3:
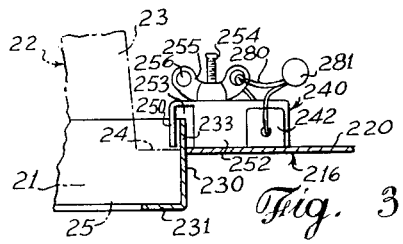
FIG. 3 is a view similar to FIG. 2 and showing a modified form of external locking mechanism for clamping the base of the meter in place on the cover of the meter box.

In the embodiment shown in FIGS. 3 and 5, it will be seen that, if desired, the cuff 230 which is otherwise identical to the cuff 30 may include an outwardly protruding extension 233 which extends beyond the front plate 220. It will be understood that, except for the extension 233, the cover 216 and its front plate 220, as well as the cuff 230 and its flange 231, are identical with the corresponding components of the preceding embodiment.

In FIG. 3 it will be seen that, since the extension 233 protrudes beyond the outer or front surface 24 of base 21, a different form of locking mechanism must be provided. The locking mechanism 240 of the present embodiment includes a channel member or keeper member having sides 242 between which is received the rectangular lock block 252.

Projecting up from the front plate 220 is a stud 254 which protrudes through a hole in block 252 and receives a wing nut 255 having the usual holes 256. The rectangular lock block 252 is sufficiently long and so dimensioned that its rear portion is received between the side plates 242 while its front portion is provided with a relatively wide downwardly opening slot 253 which receives a portion of the extension 233. Thus, the block 252, outwardly of slot 253, is provided with a downwardly extending tongue 250, the free end of which abuts against the front surface 24 of base 21 when meter 22 is properly received by the cuff 230 and abuts the flange 231.

With the block 252 in its normal position, as shown in FIG. 3, an opening in block 252 is aligned with openings in the side members 242 whereby a cable 280 of a seal 281 may be passed through these aligned openings and through one of the holes 256 in the wing nut 255. It will be understood that when seal 281 is closed, and so long as the seal 281 remains unbroken or the cable 280 remains unsevered, the wing nut 255 is incapable of being rotated to any appreciable extent. Further, that portion of cable 280 which extends through the aligned holes will prevent any appreciable movement of the locking block 252. Thus, the meter 22 is locked in place on the cover plate 220. When it is desired to remove the meter, the seal 281 is first removed and the nut 255 removed thereafter. Next, the block 252 is removed from stud 254.

Figure 7:
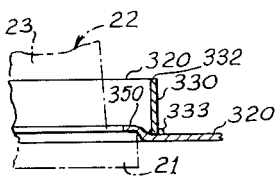
FIG. 7 is a view similar to FIGS. 2, 3, and 4 and showing still another modified form of the present invention.

In FIG. 7 is illustrated the front plate 320 of a conventional ringless type meter box, the front plate 320 having a central opening for receiving the meter 22 and a lip 350 for overlapping the front surface 24 of base 21. According to the present invention, the front plate 320 is provided with a hollow cylindrical or tubular cuff 330 which is slightly larger in diameter than the diameter of the central opening of cover 320. The inner edge of cuff 330 is welded by means of weld 333 to the front surface of cover plate 320, outwardly of lip 319. The outer edge 332 of the cuff 330 protrudes outwardly so as to cover a portion of the cover 23 of meter 22. By such an arrangement, the overlapping seal formed between the lip 350 and the base 21 is protected from rain and other forms of moisture, except under unusual conditions such as a windstorm of gale force.

Figure 8:
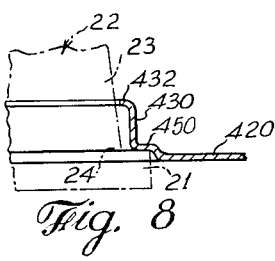
FIG. 8 is a view similar to FIGS. 2, 3, 4, and 7 and showing still a further modified form of the present invention.

In FIG. 8 it will be seen that, if desired, the cuff 430 may be formed as an integral extension of the lip 450 of the front plate 420 of a conventional ringless meter box. In this embodiment, the conventional lip 450 is offset outwardly with respect to the front plate 420 while the inner edge of the cylindrical cuff 430 is integrally connected to the inner edge of the lip 450, the cuff 430 extending outwardly therefrom and being provided at its outer extremity with an inwardly turned outer flange 432. When the conventional meter 22 is received in the conventional meter box, the lip 450 overlaps the front surface 24 of the base 21 while the cover 23 protrudes outwardly therefrom, the inner portion of cover 23 being circumscribed by the cuff 430. The lip 432 extends inwardly to terminate adjacent, but in spaced relationship to, the cover 23, thereby providing an auxiliary seal which provides for additional protection against the entrance of moisture into the interior of the meter box.

It will be understood by those skilled in the art that by the provision of an inwardly directed cuff 30, as seen in FIGS. 2, 3, 4, 5, 6, and 9, the meter 22 is capable of being spaced inwardly of the receptacle by any amount desired. Thus, it is unnecessary to space the jaws of the terminal outwardly by any appreciable amount from the back 12 of the meter box, in order for the jaws to be in a position to receive the spades of the meter. Hence, regardless of the thickness of the meter box, the meter may be recessed sufficiently to contact the jaws as mounted against the back 12 of the meter box.

With respect to FIGS. 2 and 3 it will be noted that, if desired, the studs 54 and 254 may be flattened at their outer ends to preclude the removal of nuts 55 and 255. The studs 54 and 254 are sufficiently long that the locking tongues 50 and 250 may be outwardly sufficiently to clear their keeper members and then rotated about studs 54 and 254 until they are free of the surface 24, whereby the meter 22 is freed so that it may be removed from the receptacle.

Referring now to FIGS. 10, 11, 12, and 13, the embodiment disclosed therein includes a conventional meter box, or socket, 510, which includes the opposed sides, such as side 11, a back (not shown), a top (not shown), and a bottom (not shown). The meter box 510 is provided with a front cover, denoted generally by numeral 516, the front cover being of substantially any configuration and either being fixed to the meter box 510 or removably attached thereto as is well-known in the prior art. The front cover 516 includes a flat front plate 520, provided with a central circular opening of a diameter slightly larger than the diameter of the base 21 of a conventional meter 22.

According to the present embodiment of the present invention, the cuff 530 is a right cylindrical or annular ring provided with oppositely extending flanges. The front flange 533 extends from the front edge of the cuff 530, in a radial direction outwardly, while the inner flange 531 extends from the inner edge of cuff 530, inwardly in a radial direction, the two flanges 531 and 533 being offset with respect to each other. Along the inner periphery of the flange 531, there is an upstanding shoulder 429 which is concentric with the cuff 530 but terminates well within the confines of the cuff 530.

The cuff 530 is snugly received within the cylindrical opening in plate 520, whereby the inner surface of flange 533 abuts and is contiguous with the outer surface of plate 520, adjacent the central opening thereof.

If it is desired to secure the cuff assembly of the present embodiment in place with respect to the front plate 520, the cuff 530 may be press fitted therein or the flanges 533 may be tacked welded to the front plate 520. The cuff assembly may be rendered removable from the front plate 520 by providing the central opening of front plate 520 with a slightly larger diameter than the outside diameter of the cuff 530.

In addition to securing the cuff assembly to the cover plate 520 in the various manners described above, or as an alternative to the press fitting or welding of the cuff assembly in place, the flange 531 may be provided with diametrically opposed or otherwise spaced holes 528, through which bolts or screws, such as screw 534, pass, the screws, such as screw 534, being threadedly received by appropriately placed fingers or flanges which project from the inner surface of the sides, or top or bottom of the box 510. As illustrated in FIG. 11 of the present embodiment, I prefer to secure the brackets, such as bracket 535, to the inside surface of the sides, such as side 511, so as to be diametrically opposed to each other. Each bracket 535 includes a base flange 536 which is welded or riveted in place by rivets 521. The brackets, such as bracket 535, include inwardly protruding flat fingers, such as finger 538 which is secured by its end to the end of base flange 536. The outer end portion of finger 538 is provided with an internally threaded hole which receives the screw 534, as illustrated in FIG. 11. It will be understood that when the meter box is assembled, the fingers, such as finger 538, extend parallel to but spaced inwardly from the front plate 520 and that the distance from the outer surface of the fingers, such as finger 538, to the outer surface of the front plate 520 is approximately equal to the distance from the inner surface of flange 531 to the inner surface of flange 533. Hence, the fingers, such as finger 538, in cooperation with the screw, such as screw 534, and the cuff assembly provide a means by which the cover 516 may be urged snugly against the box 510.

While it will be understood that substantially any type of latch or locking device may be employed for retaining the base, such as base 21 of meter 22 in place in the cuff assembly, I prefer to employ the locking device 540 illustrated in FIGS. 10 through 13. This locking device 540 is superior to the locking devices disclosed in the preceding embodiments in that it is readily unlocked when it is desired to remove the meter from the cuff. On the other hand, the locking device 540 is relatively strong and is not subject to being tampered with when functioning for its intended purpose. In more detail, the locking device 540 includes a U-shaped cradle or keeper member having a rectangular web 541, from the ends of which extend, in an outwardly direction, a pair of opposed parallel end plates 542. The end plates 542 are provided with rectangular slits or slots 543 which are aligned with each other and are disposed in a plane perpendicular to the plane of web 541.

The webs of 541 of the keeper members 540 are secured, as by welding or the like, to the outer surface of the flange 533 in the manner illustrated in FIG. 10, the webs 541 being disposed essentially tangentially with respect to the cuff 530 and having their upper flanges 542 disposed on the horizontal centerline of the cuff assembly.

Each keeper member 540 receives an L-shaped retaining lug which includes a locking flange 551 and a retaining tongue 550. The locking flange 551 and the retaining tongue 550 are perpendicular to each other and are integrally joined together along a common edge 553, the locking flange 551 being sufficiently long and being so dimensioned as to be received in the aligned slots 543. When the locking flange 551 is received in both slots 543, the retaining tongue 550 rests upon the upper flange 542 and protrudes therebeyond inwardly over the base, such as base 21 of the meter 22. At the same time, the lower end portion of the locking flange protrudes well below the lower flange 542. In this lower portion of the locking flange is a slot 556 through which the conventional cable or tape (not shown) of a seal may be passed to prevent the locking flange from being lifted any appreciable distance upwardly so as to permit the retaining tongue 550 to clear the base of the meter 22.

As is best seen in FIG. 12, the side of the locking flange is provided with a notch 553 which is spaced from the retaining tongue 550 by a distance less than the distance between the cooperating flanges 542. This notch 553 is adapted to receive a portion of the upper flange 542, as illustrated in FIG. 13, so as to support the retainer lug in an unlocked position. Below the notch 553 there is a protuberant member, stuck from a portion of the locking flange so as to provide a stop 554 which prevents the retainer lug from being removed from the keeper member.

It will be seen in FIG. 13 that once the locking flange 551 has cleared the lower flange 542, it may be tilted within the upper slot 543 so that the retainer lug may be moved to a position where the tongue 550 no longer protrudes into the path of exit of the base 21 of meter 22.

It will be obvious to those skilled in the art that many variations may be made in the embodiments here chosen for the purpose of illustrating the present invention, without departing from the scope thereof which is defined in the appended claims.

I claim:

1. In a meter box for supporting an electrical meter of the type having a disk-shaped base with a pair of surfaces and a transparent cover protruding forwardly from said base, said transparent cover being generally cylindrical and of a smaller diameter than said base, said meter box being of the type having a front plate through which said meter is inserted from outside the meter box and adjacent which said base is disposed, the combination therewith of a hollow cylindrical cuff concentric with said opening and carried by said front plate for surrounding said base, an annular flange protruding inwardly from said cuff and against which a surface of said base abuts to limit the movement of said meter in one direction, said cuff having a depth equal to or greater than the thickness of said base such that when said base is received by said meter box said base is entirely within the confines of said cuff, and means protruding over the other surface of said base for limiting the movement of said meter in the other direction.

2. In a meter box for supporting an electrical meter of the type having a disk-shaped base with a transparent cover protruding forwardly therefrom, said transparent cover being generally cylindrical and of a smaller diameter than said base, said meter box being of the type having a front plate through which said meter projects and adjacent which said base is disposed, the combination therewith of a hollow cylindrical cuff concentric with said opening and carried by said front plate for surrounding and snugly receiving the peripheral edge of said base, an annular flange protruding inwardly from one end of said cuff and against which the inner surface of said base abuts to limit the inward movement of said meter, said cuff having a depth equal to or greater than the thickness of said base, and a lock mechanism disposed on said front plate and protruding over the outer surface of said base for limiting the outward movement of said meter.

3. In a meter box for supporting an electrical meter of the type having a disk-shaped base with a transparent cover protruding forwardly therefrom, said transparent cover being generally cylindrical and of a smaller diameter than said base, said meter box being of the type having a front plate through which said meter projects and adjacent which said base is disposed, the combination therewith of a hollow cylindrical cuff concentric with said opening and carried by said front plate for surrounding said base, an annular flange protruding inwardly from one end of said cuff and against which the inner surface of said base abuts to limit the inwrd movement of said meter, said cuff having a depth equal to or greater than the thickness of said base, and a lock mechanism disposed on said front plate and protruding over the outer surface of said base for limiting the outward movement of said meter, said annular flange being spaced inwardly of the surface of said front plate to permit said meter to be recessed within said meter box.

4. In a meter box for supporting an electrical meter of the type having a disk-shaped base with a transparent cover protruding forwardly therefrom, said transparent cover being generally cylindrical and of a smaller diameter than said base, said meter box being of the type having a front plate through which said meter projects and adjacent which said base is disposed, the combination therewith of a hollow cylindrical cuff concentric with said opening and carried by said front plate for surrounding said base, an annular flange protruding inwardly from one end of said cuff and against which the inner surface of said base abuts to limit the inward movement of said meter, said cuff having a depth equal to or greater than the thickness of said base, and a lock mechanism for limiting the outward movement of said meter, said locking mechanism including a keeper member secured to said front plate and a locking lug movably carried by said keeper member, said lug having a position thereof projectable over a portion of said base.

5. In a meter box having a receptacle and a removable cover, said cover being provided with an opening for the receipt therethrough of a meter of the type having a disk-shaped base and a cover of smaller diameter than said base extending forwardly from said base, the combination therewith of a hollow cuff secured to said front cover for surrounding the periphery of said base, said cuff projecting axially of said meter and having an inner annular flange engageable with the inner surface of said base for limiting the inward movement of said meter with respect to said receptacle, means adjacent said cuff and engagegable with the outer surfaces of said base for limiting the outward movement of said meter with respect to said receptacle, said means including a locking mechanism including a keeper member fixed with respect to said cuff and a lug projectable over a portion of one surface of said base, and means accessible when said meter is removed from said meter box and inaccessible when said meter is installed on said meter box for securing said cover in place on said receptacle.

6. In a meter box of the type having a cover with an opening through which a portion of a meter projects when a meter is installed thereon, a continuous flange supported by said cover and disposed concentrically with and inwardly of said opening, said flange being arranged with said cover so that said meter is movable through said cover to abut said flange, a lock mechanism disposed on said cover, said lock mechanism including a keeper member fixed on said cover and a lug movably carried by said keeper member for projecting inwardly into engagement with said meter for locking the same with respect to said cover against said flange.

7. In a meter box of the type having a cover with an opening through which a portion of a meter projects when a meter is installed thereon, a lock mechanism disposed on said cover, said lock mechanism including a keeper member fixed on said cover and a lug movably carried by said keeper member for projecting inwardly into engagement with said meter for locking the same with respect to said cover, said keeper member being provided with a threaded hole disposed at an acute angle with respect to said cover, said lug being provided with external threads and threadedly received in said hole, the end of said lug being projectable toward and away from said meter upon rotation of said lug in one direction and the other.

8. In a meter box of the type having a cover with an opening through which a portion of a meter projects when a meter is intalled thereon, a lock mechanism disposed on said cover, said lock mechanism including a keeper member fixed on said cover, a lug movably carried by said keeper member for projecting inwardly into engagement with said meter for locking the same with respect to said cover, said keeper member including a channel member for positioning said lug and a stud protruding outwardly from said cover, said lug being provided with a hole through which said stud projects and being so dimensioned as to simultaneously protrude over a portion of said meter and be received in said channel member when said stud projects through said hole, a nut for adjustably retaining said lug in place, and a seal member passing through said nut for preventing appreciable rotation of said nut except when said seal member is removed therefrom.

9. A cuff assembly for the cover of a meter box for receiving therein a base of an electrical meter, comprising, a hollow right cylindrical cuff having an inside diameter slightly larger than the diameter of the said base of said meter, a front flange disposed in a radial plane with respect to and extending outwardly from the front edge of said cuff, and a continuous inner flange disposed in a plane parallel to and spaced from said front flange, said inner flange extending inwardly from the inner edge of said cuff, said cuff being adapted to receive snugly therein said base of said meter and being of a depth from its front edge to the surface of said inner flange, approximately equal to the depth of said base of said meter, said cuff having an outside diameter sufficiently small that it may be received within an opening in said cover of said meter box with said front flange flat against the front surface of said cover.

10. The structure defined in claim 9 wherein said inner flange includes a plurality of apertures through which bolts may project for securing said inner flange to said meter box.

References Cited by the Examiner

UNITED STATES PATENTS

| 1,648,686 | 11/27 | Holmes | 317—107 X |
| 2,206,408 | 7/40 | Kuhn | 317—107 X |
| 2,642,483 | 6/53 | Wey | 317—110 X |
| 2,866,936 | 12/58 | Moore | 317—109 X |
| 2,907,927 | 10/59 | Fisher | 317—109 |
| 2,907,928 | 10/59 | Rutledge et al. | 174—52 X |
| 2,972,656 | 2/61 | Fisher | 174—52 X |
| 3,142,001 | 7/64 | Spencer et al. | 317—105 |

FOREIGN PATENTS 544,798   8/57   Canada.

JOHN F. BURNS, Primary Examiner.

JOHN P. WILDMAN, LARAMIE E. ASKIN,
Examiners.